H. W. SEAMAN.
Toaster and Broiler.

No. 213,456.  Patented Mar. 18, 1879.

UNITED STATES PATENT OFFICE.

HORACE W. SEAMAN, OF MILL PORT, NEW YORK.

IMPROVEMENT IN TOASTERS AND BROILERS.

Specification forming part of Letters Patent No. 213,456, dated March 18, 1879; application filed October 23, 1878.

*To all whom it may concern:*

Be it known that I, H. W. SEAMAN, of Mill Port, in the county of Chemung and State of New York, have invented certain new and useful Improvements in Toaster and Broiler; and I do hereby declare that the following is a full, clear, and exact description of the invention, which will enable others skilled in the art to which it appertains to make and use the same, reference being had to the accompanying drawings, which form a part of this specification.

Figure 1:
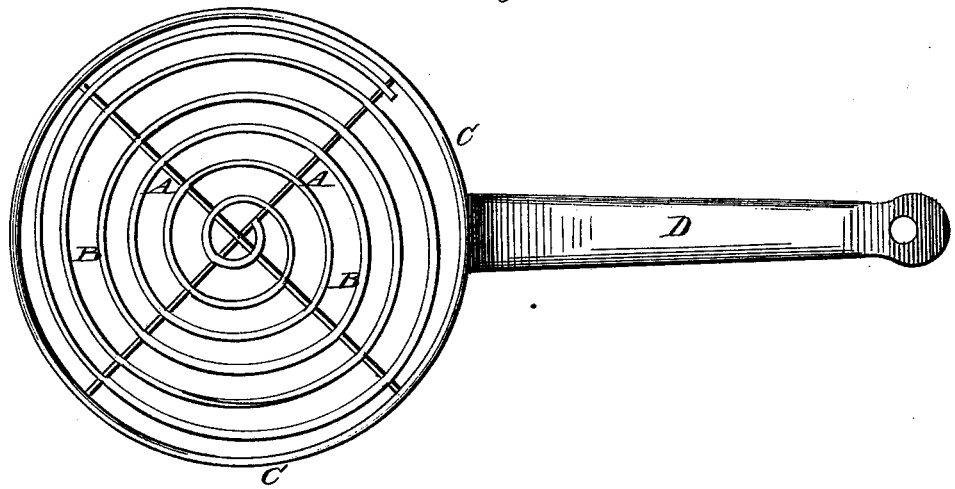
Figure 2:
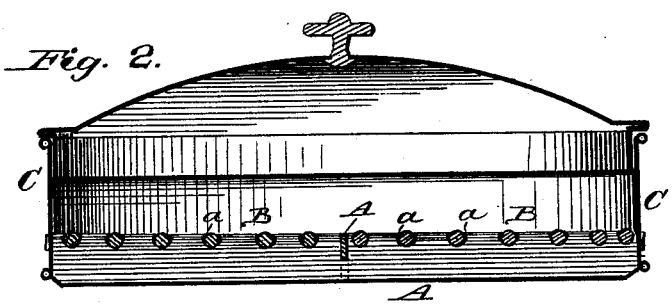

Figure 1 is a plan view, and Fig. 2 is a vertical cross-section, of my improved broiler.

Similar letters of reference denote corresponding parts in both figures.

This invention relates to certain improvements in the construction of broilers or toasters, as will be hereinafter more fully described, and particularly pointed out in the claim.

In the drawings, A A represent two cross-bars, mortised together at the center, so as to form a neat and flush joint. The bars A A are provided with notches *a a*, suitable distances apart, to receive the coil of wire B, which is coiled from the center, as shown, and retained in the notches by forcing the metal of which the bars A are made down over the wire, as shown. The ends of bars A A are tenoned and passed through suitable openings in the rim C, on the outside of which they are riveted down or clinched, so as to be retained securely in position. A suitable cover, fitting upon or in the rim C, may be provided.

This device forms an excellent meat-broiler or bread-toaster. It is simple and durable, and may be manufactured at a very small cost.

It is obvious that it may be made round, oval, square, or, indeed, in any other suitable shape.

I have also, in the drawings, shown it provided with a handle, D, by which it may be conveniently manipulated.

I am aware that cooking utensils have been constructed of separate concentric wire rings, suitably connected.

I am also aware of the patent to Johnson, August 6, 1867, which shows a simple wire coil. Such I do not claim; but,

Having thus described my invention, I claim and desire to secure by Letters Patent of the United States—

The improved toaster and broiler herein described, consisting of the rim C, having notched cross-bars A A, in which a continuous wire coil, B, is secured by forcing the metal of the cross-bars down over the wire, substantially as shown, for the purpose set forth.

In testimony that I claim the foregoing as my own I have hereto affixed my signature in presence of two witnesses.

HORACE WARREN SEAMAN.

Witnesses:
DEXTER WHITE,
GEORGE M. BEARD.